(12) United States Patent
Hogerton et al.

(10) Patent No.: US 7,383,864 B2
(45) Date of Patent: Jun. 10, 2008

(54) RADIO-FREQUENCY IDENTIFICATION TAG AND TAPE APPLICATOR, RADIO-FREQUENCY IDENTIFICATION TAG APPLICATOR, AND METHODS OF APPLYING RADIO-FREQUENCY IDENTIFICATION TAGS

(75) Inventors: Peter B. Hogerton, White Bear Lake, MN (US); Karl M. Kropp, St. Paul, MN (US); Gary K. Kuhn, Stillwater, MN (US); Michael R. Mitchell, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 900 days.

(21) Appl. No.: 10/115,353

(22) Filed: Apr. 3, 2002

(65) Prior Publication Data

US 2003/0189490 A1    Oct. 9, 2003

(51) Int. Cl.
*B32B 37/00* (2006.01)
(52) U.S. Cl. .............. 156/350; 156/378; 156/521; 156/542
(58) Field of Classification Search .......... 156/538, 156/539, 540, 541, 542, 556, 350, 351, 378, 156/510, 521; 340/10.1–10.6, 572.1, 572.8
See application file for complete search history.

(56) References Cited

U.S. PATENT DOCUMENTS 4,602,977 A * 7/1986 Voltmer et al. ............. 156/449
4,869,769 A * 9/1989 DiRusso et al. ............ 156/269
5,056,142 A   10/1991 Lapointe et al.

(Continued)

FOREIGN PATENT DOCUMENTS

DE         94 07 696         10/1994

(Continued)

OTHER PUBLICATIONS

U.S. Appl. No. 09/893,823, filed Jun. 28, 2001, Packaging Label.

(Continued)

*Primary Examiner*—James Sells
(74) *Attorney, Agent, or Firm*—Melissa E. Buss

(57) ABSTRACT

A radio-frequency identification tag and tape applicator. A preferred embodiment of the invention provides an applicator that includes a tag and tape handling system having a base, a tape supply holder attached to the base, a tag supply holder attached to the base, a tag applying mechanism attached to the base for applying a tag to a length of tape and that includes a taping head for applying the tag and the length of tape to an object. A preferred embodiment of the invention provides a radio-frequency identification tag applicator that includes a tag supply holder, a carrier roll holder, a carrier path from the supply roll holder to the carrier roll holder, a tag dispensing mechanism along the carrier path between the supply roll holder and the carrier roll holder for applying a tag to an object, and an interrogator for writing information to tags along the carrier path between the tag supply holder and the tag dispensing mechanism. The present invention also relates to methods of applying a radio-frequency identification tag to tape and to a variety of preferred embodiments of a package in combination with a radio-frequency identification tag.

8 Claims, 5 Drawing Sheets

U.S. PATENT DOCUMENTS

| | | | |
|---|---|---|---|
| 5,085,918 | A | 2/1992 | Rajan et al. |
| 5,153,842 | A | 10/1992 | Dlugos, Sr. et al. |
| 5,173,140 | A | 12/1992 | Vasilakes |
| 5,191,193 | A | 3/1993 | Le Roux |
| 5,228,943 | A | 7/1993 | Vasilakes |
| 5,229,587 | A | 7/1993 | Kimura et al. |
| 5,232,539 | A | 8/1993 | Carpenter et al. |
| 5,310,036 | A | 5/1994 | Hell |
| 5,339,073 | A | 8/1994 | Dodd et al. |
| 5,342,461 | A | 8/1994 | Murphy |
| 5,378,575 | A | 1/1995 | Rajan et al. |
| 5,405,482 | A | 4/1995 | Morrissette et al. |
| 5,469,363 | A | 11/1995 | Saliga |
| 5,507,907 | A | 4/1996 | Kropp et al. |
| 5,539,775 | A | 7/1996 | Tuttle et al. |
| 5,541,577 | A | 7/1996 | Cooper et al. |
| 5,552,994 | A | 9/1996 | Cannon et al. |
| 5,600,563 | A | 2/1997 | Cannon et al. |
| 5,629,981 | A | 5/1997 | Nerlikar |
| 5,685,814 | A | 11/1997 | Le |
| 5,711,831 | A * | 1/1998 | Taylor ............ 156/64 |
| 5,730,831 | A | 3/1998 | Jensen, Jr. et al. |
| 5,768,384 | A | 6/1998 | Berson |
| 5,787,174 | A | 7/1998 | Tuttle |
| 5,843,252 | A | 12/1998 | Murphy |
| 5,862,325 | A | 1/1999 | Reed et al. |
| 5,897,741 | A | 4/1999 | Mills et al. |
| 5,929,760 | A * | 7/1999 | Monahan ............ 340/572.7 |
| 5,929,779 | A * | 7/1999 | MacLellan et al. ........ 340/10.2 |
| 5,935,217 | A | 8/1999 | Sakai et al. |
| 5,971,437 | A | 10/1999 | Sakashita |
| 5,974,441 | A | 10/1999 | Rogers et al. |
| 6,002,344 | A | 12/1999 | Bandy et al. |
| 6,004,424 | A | 12/1999 | Faust |
| 6,028,518 | A * | 2/2000 | Rankin et al. ........... 340/572.1 |
| 6,049,347 | A | 4/2000 | Ewert et al. |
| 6,067,103 | A | 5/2000 | Ewert et al. |
| 6,067,773 | A | 5/2000 | Le |
| 6,073,140 | A | 6/2000 | Morgan et al. |
| 6,088,717 | A | 7/2000 | Reed et al. |
| 6,107,920 | A | 8/2000 | Eberhardt et al. |
| 6,125,374 | A | 9/2000 | Terry et al. |
| 6,141,654 | A | 10/2000 | Heiden et al. |
| 6,147,604 | A | 11/2000 | Wiklof et al. |
| 6,159,328 | A * | 12/2000 | Gaikoski et al. ............ 156/269 |
| 6,162,550 | A * | 12/2000 | Pinchen et al. ............. 428/624 |
| 6,167,442 | A | 12/2000 | Sutherland et al. |
| 6,246,326 | B1 | 6/2001 | Wiklof et al. |
| 6,280,544 | B1 | 8/2001 | Fox et al. |
| 6,281,795 | B1 * | 8/2001 | Smith et al. ............. 340/572.1 |
| 6,317,149 | B1 | 11/2001 | Mochida et al. |
| 6,349,974 | B1 | 2/2002 | Grosskopf et al. |
| 6,617,962 | B1 * | 9/2003 | Horwitz et al. ............ 340/10.4 |
| 2001/0017322 | A1 | 8/2001 | Duldhardt |
| 2002/0030597 | A1 | 3/2002 | Muirhead |

FOREIGN PATENT DOCUMENTS

| | | |
|---|---|---|
| DE | 43 41 880 | 6/1995 |
| EP | 0 030 381 | 12/1980 |
| EP | 0 615 285 | 9/1994 |
| EP | 0 673 007 | 9/1995 |
| EP | 0 710 934 | 5/1996 |
| EP | 0 861 788 | 9/1998 |
| EP | 0 889 448 | 1/1999 |
| EP | 0 969 433 | 1/2000 |
| EP | 0 982 688 | 3/2000 |
| EP | 0 996 084 | 4/2000 |
| EP | 1 022 708 A2 | 7/2000 |
| EP | 1 236 650 | 9/2002 |
| FR | 2 697 929 | 5/1994 |
| FR | 2 764 977 | 12/1998 |
| GB | 1 323 552 | 7/1973 |
| JP | 2000-219432 | 8/2000 |
| JP | 2001-096814 | 4/2001 |
| WO | WO 94/22580 | 10/1994 |
| WO | WO 99/05659 | 2/1999 |
| WO | WO 99/65006 | 12/1999 |
| WO | WO 00/10122 | 2/2000 |
| WO | WO 00/10144 | 2/2000 |
| WO | WO 00/34131 | 6/2000 |
| WO | WO 00/42569 | 7/2000 |
| WO | WO 00/47410 | 8/2000 |
| WO | WO 00/67153 | 11/2000 |
| WO | WO 01/00493 | 1/2001 |
| WO | WO 01/10472 | 2/2001 |
| WO | WO 01/10473 | 2/2001 |
| WO | WO 01/10474 | 2/2001 |
| WO | WO 01/10475 | 2/2001 |
| WO | WO 01/10476 | 2/2001 |
| WO | WO 01/96184 A1 | 12/2001 |
| WO | WO 03/025833 | 3/2003 |

OTHER PUBLICATIONS

U.S. Appl. No. 09/498,902, filed Feb. 4, 2000, Method of Authenticating a Tag.

"RFID Goes Mainstream. The smart-label business finally joins the real-world supply chain, with working products and solid profits."; Kevin R. Sharp, www.idsystems.com, Jan. 2001.

Frontine Solutions Expo Session #-38 "Why 'Intelligent' Labels are so smart!", Wednesday, Oct. 4, 2000.

Instructions and Parts List, 3M-Matic™ 700r (Type 19000) Random Case Sealer with AccuGlide™ II Taping Heads, pp. 1-90, 3M Packaging Systems Division, 3M 1991.

Instructions and Parts List, 3M-Matic™ 700rks (Type 19300) Random Case Sealer with AccuGlide™ II Taping Heads, pp. 1-97, 3M Packaging Systems Division, 3M 1998.

Finkenzeller, Klaus, "RFID Handbook—Radio-Frequency Identification Fundamentals and Applications," 1999, pp. 151-158 and Table 14.1 (pp. 278-287).

Schneier, Bruce, "Applied Cryptography—Protocols, Algorithms, and Source Code in C," 2$^{nd}$ Edition, 1996, pp. 442-445.

Menezes et al., "Handbook of Applied Cryptography," 1997, pp. 348-349.

Web pages from Texas Instruments Incorporated relating to TIRIS Tag-it™—The New World of Smart Labels, 1998, 8 pages.

* cited by examiner

RADIO-FREQUENCY IDENTIFICATION TAG AND TAPE APPLICATOR, RADIO-FREQUENCY IDENTIFICATION TAG APPLICATOR, AND METHODS OF APPLYING RADIO-FREQUENCY IDENTIFICATION TAGS

TECHNICAL FIELD

The present invention generally relates to a radio-frequency identification tag and tape applicator. The present invention relates more particularly to a radio-frequency identification tag and tape applicator that applies a tag to a length of tape and then applies the length of tape including the tag to an object. The present invention also generally relates to a radio-frequency identification tag applicator that applies radio-frequency identification tags to objects. The present invention also generally relates to methods of applying radio-frequency identification tags to tape. The present invention also generally relates to a variety of embodiments of a package in combination with a radio-frequency identification tag.

BACKGROUND OF THE INVENTION

Various radio-frequency identification tags (RFID tags) are known in the art. For example, radio-frequency identification tags are commercially available from Intermec Technologies Corporation located in Everett, Wash. as Intellitag brand RFID tags. RFID tags are also currently available from Rafsec OY, located in Tampere, Finland, and from SCS Corporation located in San Diego, Calif. under the brand named Duralabel. Radio-frequency identification tags are also known as radio-frequency identification inlets or radio-frequency identification transponders.

Radio-frequency identification tag systems have been proposed for use in inventory tracking. In such a system, a radio-frequency identification tag is attached to an item or package or location, and contains a non-volatile memory for storing information identifying the item or package or location and electronic circuitry for interacting with an interrogator. Radio-frequency identification tags may be passive or active. In the case of a passive radio-frequency identification tag, the tag includes circuitry for converting at least a portion of the received RF signals into electrical power needed by the tag for signal processing and transmission. In a typical conventional system, radio-frequency identification tags containing information associated with the identities of inventory items to be tracked are attached to the inventory items. A radio-frequency identification interrogator is used to detect the presence of a radio-frequency identification tag and read the identification information from the tag.

A typical radio-frequency identification interrogator includes a radio-frequency transceiver for transmitting interrogation signals to and receiving response signals from radio-frequency identification tags, one or more antennae connected to the transceiver, and associated decoders and encoders for reading and writing the encoded information in the received and transmitted radio-frequency signals, respectively. The interrogator may be a portable device, which can be brought near the tags to be read; or it may be a stationary device, which reads the tags as they are brought to the interrogator, as in the case of tagged library books being returned to a return station that is fitted with an interrogator.

Various apparatuses and methods for printing labels are known in the art. For example, EP Patent No. 0996 084 A2, "Device for Printing on a Medium," describes a device intended to be used to print on a medium that has a sending-and/or receiving-device, a printer and a write- and or read-device are intended. The printer prints the medium depending on the received print data, and the write- and/or read-device communicates with the sending- and/or receiving device in the medium.

U.S. Pat. No. 5,405,482 (Morrissette et al.) "Labeling Machine," in its abstract, describes a labeling machine in which pressure sensitive adhesively backed labels are releasably adhered to a backing strip moving along a path from a dispensing roll to a take-up roll. The labels are removed from the backing strip onto a rotating applicator drum at a first station along said path, and the thus removed labels are transferred from the applicator drum at a first station along said path, and the thus removed labels are transferred from the applicator drum to articles being successively presented at a second station. The improvement comprises a scanning unit, a comparator unit, and a removal unit. The scanning unit is positioned in advance of the first station for reading indicia appearing on the labels adhered to said backing strip. The comparator unit is associated with the scanning unit for comparing the indicia on the labels with a preselected standard and for generating a control signal in the event of a mismatch between the standard and the indicia appearing on an incorrect label. The removal unit is responsive to the control signal for removing the incorrect label from the applicator drum at a location intermediate the first and second station.

U.S. Pat. No. 5,342,461 (Murphy), "High Speed Continuous Conveyor Printer/Applicator," in its abstract, describes a label printer and applicator system which determines the height and position of moving objects on a conveyor while printing labels and positioning the labels for application on the moving objects. The printer/applicator includes a controllable label buffer, applicator actuator and label ejector to receive and apply the printed label, or eject the label when it has been determined that the application to the object cannot be made. Further embodiments include multiple applicators deployed along the conveyor to permit higher conveyor velocities and avoidance of unlabeled objects due the height/proximity relationships with adjacent packages.

U.S. Pat. No. 5,229,587 (Kimura et al.), "Bar Code Label Printer and Bar Code Label Issuing Method," in its abstract, describes a bar code label printer including a label sheet feeding unit for feeding a label sheet on which plural labels are adhered to at regular intervals, a printing unit for printing a bar code on the respective labels, a label peeling unit for peeling the printed labels from the label sheet, a sheet drawing unit for drawing the label sheet after the peeling unit, a bar code verifying unit for verifying the bar code printed on the label to detect an ineffective bar code, a re-printing unit for re-printing the same bar code as the ineffective bar code on the next label when the bar code verifying unit detects the ineffective bar code, and an ineffective bar code label remaining unit for remaining the ineffective bar code label on the label sheet without peeling. A bar code label issuing method uses the above described bar code label printer to issue only effective bar code label in an automatically control manner.

U.S. Pat. No. 5,232,539 (Carpenter et al.), "Object Labeling Machine," in its abstract, describes a machine for applying labels to products of various sizes that employs a movable printer-applicator head. Control circuitry responsive to sensors located along a conveyor by which the products are moved toward the machine generates output signals to an electrical motor which drives the printer/applicator head at a speed defined by the processor output signals. Labels to be printed are supplied to the head from a label supply strip wound on a label supply reel mounted on the stationary part of the machine. The portion of the strip extending between the reel and the head is provided with a loop to assure sufficient length of the strip for free movement by the head. The strip is lengthened by an amount less than the length of a label each time a label is removed and is lengthened by an additional amount each time a short-loop condition is detected. A pick plate assembly for removing unwanted labels is maintained in a retracted position along one side of the head when not in use, in order to avoid interference with the products to be labeled.

U.S. Pat. No. 5,971,437 (Sakashita), "Non-contact Type Data Carrier Label," in its abstract, describes a non-contact type data carrier label having a data carrier for storing information and a support member for holding the data carrier, which it is able to attach to a product. The support member has a holding portion for holding the data carrier and paste portion to be pasted on the product in a attachable/detachable manner. A releasable type adhesive layer is formed on the support member. Thus, the data carrier label can be attached to and detached from the product more easily compared with that of conventional one.

U.S. Pat. No. 5,153,842 (Dlugos, Sr. et al.), "Integrated Circuit Package Label and/or Manifest System," in its abstract, describes an integrated circuit card including a microprocessor, a memory and input and output devices. The card stores information regarding a parcel. The card is secured to the parcel and serves as a label. The card includes a liquid crystal display that displays a bar code. A similar integrated circuit card stores manifest data regarding a group of parcels. The card containing the manifest data is delivered to a carrier together with the group of parcels.

EP patent No. 0673007, "Improvements in or Relating to Article Tagging," in its abstract, describes a tagging material comprising a pressure sensitive adhesive tape incorporating electromagnetic sensor material whose presence can be detected. Tags are cut from the tagging material as the tagging material and articles are conveyed along converging paths and are adhered to the articles by the adhesive of the tape by means of apparatus comprising a tagging material feeding means and an applicator head.

Various apparatuses and methods for attaching tape to articles are known in the art. For example, box-sealing apparatuses are described in U.S. Pat. Nos. 5,507,907, 5,685,814, 5,730,831, 6,067,773, and 6,004,424. Minnesota Mining and Manufacturing Company, located in St. Paul, Minn., has sold one example of a box sealing apparatus under the trade name 3M-Matic, as a 700rks Random Case Sealer. Various taping heads for applying tape are also known in the art. For example, taping heads for applying tape are described in U.S. Pat. No. 5,173,140 and U.S. Pat. No. 5,228,943. Minnesota Mining and Manufacturing Company, located in St. Paul Minn., has sold one example of a taping head under the trade name AccuGlide II.

Various apparatuses and methods for printing on tape and applying a length of printed tape to articles are known in the art. For example, apparatuses for printing and applying tape are described in U.S. Pat. No. 6,049,347 (Ewert et al.), "Apparatus for Variable Image Printing on Tape," U.S. Pat. No. 6,067,103 (Ewert et al.) "Apparatus and Process for Variable Image Printing on Tape," and PCT Publication WO 00/34131 (Faust et al.) "Variably Printed Tape And System For Printing And Applying Tape Onto Surfaces." Minnesota Mining and Manufacturing Company located in St. Paul, Minn. has sold print and apply case sealing applicators and print and apply corner sealing applicators under the brand name 3M-Matic as CA2000 Corner Label Applicator and PS2000 Print & Seal Applicator.

SUMMARY OF THE INVENTION

One aspect of the present invention provides a radio-frequency identification tag and tape applicator. The radio-frequency identification tag and tape applicator comprises: a) a tag and tape handling system, comprising: i) a base; ii) a tape supply holder attached to the base; iii) a tag supply holder attached to the base; and iv) a tag applying mechanism attached to the base for applying a tag to a length of tape; and b) a taping head for applying the tag and the length of tape to an object.

In one preferred embodiment of the above applicator, the taping head comprises: i) a tape cutting mechanism; and ii) a tape applying mechanism. In one aspect of this embodiment, the tag and tape applicator includes a tape path between the tape supply holder and the tape applying mechanism, wherein the tape cutting mechanism is located on the tape path between the tape supply holder and the tape applying mechanism, and wherein the tag applying mechanism is located on the tape path between the tape supply holder and the tape cutting mechanism. In another aspect of this embodiment, the tag and tape handling system further comprises: v) a carrier roll holder attached to the base; and vi) a carrier path from the tag supply holder to the carrier roll holder.

In another preferred embodiment of the above applicator, the tag and tape handling system further comprises a first interrogator attached to the base. In one aspect of this embodiment, the applicator further comprises a roll of a plurality of radio-frequency identification tags on a carrier mounted on the tag supply holder and a roll of tape mounted on the tape supply holder. In another aspect of this embodiment, the first interrogator tests one of the radio-frequency identification tags for the functionality of the tag, and if the tag is functional, then the first interrogator writes information to the tag. In another aspect of this embodiment, after the first interrogator writes the information to the tag, the first interrogator reads the tag for the information to verify the information was properly written to the tag.

In another aspect of this embodiment, the tag applying mechanism is movable between a first position and a second position, wherein when the tag applying mechanism is in the first position, the tag applying mechanism does not apply one of the radio-frequency identification tags to a length of tape, and wherein when the tag applying mechanism is in the second position, the tag applying mechanism applies one of the radio-frequency identification tags to the length of tape. In another aspect of this embodiment, after the first interrogator writes information to the tag, the tag applying mechanism moves to the second position to apply the tag to the length of tape. In another aspect of this embodiment, wherein when the tag applying mechanism is in the second position, the tag applying mechanism contacts the tape to adhere one of the radio-frequency identification tags to the tape and to separate the tag from the carrier. In another preferred embodiment of the above applicator, the applicator further comprises a second interrogator for reading information from the tag.

Another aspect of the present invention provides an alternative radio-frequency identification tag and tape applicator. The radio-frequency identification tag and tape applicator comprises: a) a tag and tape handling system, comprising: i) a base; ii) a tape supply holder attached to the base; iii) a tag supply holder attached to the base; and iv) a tag applying mechanism attached to the base for applying a tag to a length of tape; v) a carrier roll holder attached to the base; and vi) a carrier path from the tag supply holder to the carrier roll holder; and vii) a first interrogator attached to the base; b) a roll of a plurality of radio-frequency identification tags on a carrier mounted on the tag supply holder; and c) a roll of tape mounted on the tape supply holder; d) a taping head for applying the tag and the length of tape to an object, wherein the taping head comprises: i) a tape cutting mechanism; and ii) a tape applying mechanism, wherein the tag applying mechanism is movable between a first position and a second position, wherein when the tag applying mechanism is in the first position, the tag applying mechanism does not apply one of the radio-frequency identification tags to a length of tape, and wherein when the tag applying mechanism is the second position, the tag applying mechanism applies one of the radio-frequency identification tags to the length of tape; and e) a tape path between the tape supply holder to the tape applying mechanism, wherein the tape cutting mechanism is located on the tape path between the tape supply holder and the tape applying mechanism, and wherein the tag applying mechanism is located on the tape path between the tape supply holder and the tape cutting mechanism; wherein the first interrogator tests one of the radio-frequency identification tags for the functionality of the tag, and if the tag is functional, then the first interrogator writes information to the tag, wherein after the first interrogator writes the information, the first interrogator reads the tag for the information to verify the information was properly written to the tag, and wherein after the first interrogator verifies the information, the tag applying mechanism moves to the second position to contact the tape to adhere one of the radio-frequency identification tags to the tape and to separate the tag from the carrier.

Another aspect of the present invention provides a radio-frequency identification tag applicator. The radio-frequency identification tag applicator comprises: a) a radio-frequency identification tag supply holder; b) a carrier roll holder; c) a carrier path from the radio-frequency identification supply roll holder to the carrier roll holder; d) a tag dispensing mechanism along the carrier path between the radio-frequency identification supply roll holder and the carrier roll holder for applying a tag to an object; and e) an interrogator for writing information to radio-frequency identification tags along the carrier path between the radio-frequency identification tag supply holder and the tag dispensing mechanism.

In one preferred embodiment of the above applicator, the applicator further comprises a roll of a plurality of radio-frequency identification tags on a carrier mounted on the tag supply holder. In one aspect of this embodiment, the interrogator tests one of the radio-frequency identification tags for the functionality of the tag, and if the tag is functional, then the interrogator writes information to the tag. In another aspect of this embodiment, after the interrogator writes the information to the tag, the interrogator reads the tag for the information to verify the information was properly written to the tag. In another aspect of this embodiment, the tag dispensing mechanism is movable between a first position and a second position, wherein when the tag dispensing mechanism is in the first position, the tag dispensing mechanism dispenses one of the radio-frequency identification tags, and wherein when the tag dispensing mechanism is the second position, the tag dispensing mechanism does not dispense one of the radio-frequency identification tags for application to the object. In another aspect of this embodiment, after the interrogator writes information to the tag, the tag applying mechanism is in the first position to apply the tag to the object.

Another aspect of the present invention provides an alternative radio-frequency identification tag applicator. The radio-frequency identification tag applicator comprises: a) a radio-frequency identification tag supply holder; b) a carrier roll holder; c) a carrier path from the radio-frequency identification supply roll holder to the carrier roll holder; d) a tag dispensing mechanism along the carrier path between the radio-frequency identification supply roll holder and the carrier roll holder for applying a tag to an object, wherein the tag dispensing mechanism is movable between a first position and a second position, wherein when the tag dispensing mechanism is in the first position, the tag dispensing mechanism dispenses the tag, and wherein when the tag dispensing mechanism is the second position, the tag dispensing mechanism does not dispense the tag for application to the object; e) an interrogator for writing information to radio-frequency identification tags along the carrier path between the radio-frequency identification tag supply holder and the tag dispensing mechanism; and f) a roll of a plurality of radio-frequency identification tags on a carrier mounted on the tag supply holder; wherein the interrogator tests one of the radio-frequency identification tags for the functionality of the tag, and if the tag is functional, then the interrogator writes information to the tag, wherein after the interrogator writes the information to the tag, the interrogator reads the tag for the information to verify the information was properly written to the tag, and wherein after the first interrogator verifies the information, the tag applying mechanism remains in the first position to apply the tag to the object.

Another aspect of the present invention provides a package in combination with a radio-frequency identification tag. The package in combination with a radio-frequency identification tag comprises: a) a package; b) a length of tape applied to the package; and c) a radio-frequency identification tag located between the tape and the package. In one preferred embodiment of the above package, the package is a box. In one aspect of this embodiment, the length of tape is applied to seal the box. In another aspect of this embodiment, the length of tape extends around a corner of the box. In another aspect of this embodiment, the length of tape is applied to a side of the box. In another aspect of this embodiment, the length of tape is applied to a minor flap of the box. In another aspect of this embodiment of the above package, the package includes contents, and wherein the radio-frequency identification tag contains information about the contents.

Another aspect of the present invention provides a method of applying a radio-frequency identification tag to tape. The method of applying a radio-frequency identification tag to tape comprises the steps of: providing a length of tape, wherein the length of tape includes a backing and an adhesive on the backing; providing a first radio-frequency identification tag on a carrier; contacting the first radio-frequency identification tag to the adhesive of the tape; and separating the radio-frequency identification tag from the carrier to apply the first radio-frequency identification tag to the length of tape.

In one preferred embodiment of the above method, the method comprises the further step of: prior to the contacting step, testing the radio-frequency identification tag for the functionality of the radio-frequency identification tag. In one aspect of this embodiment, if the radio-frequency identification tag is functional, then writing information to the radio-frequency identification tag. In another aspect of this embodiment, if the radio-frequency identification tag is not functional, then providing a second radio-frequency identification tag on the carrier and repeating the contacting step and the separating step. In another aspect of this embodiment, the method further comprises the further step of: applying the length of tape and the radio-frequency identification tag to an object.

Another aspect of the present invention provides an alternative method of applying a radio-frequency identification tag to tape. The method of applying a radio-frequency identification tag to tape, comprises the steps of: providing a length of tape, wherein the length of tape includes a backing and an adhesive on the backing; providing a first radio-frequency identification tag on a carrier; testing the radio-frequency identification tag for the functionality of the radio-frequency identification tag, and if the radio-frequency identification tag is functional, then writing information to the radio-frequency identification tag; contacting the first radio-frequency identification tag to the adhesive of the tape; separating the radio-frequency identification tag from the carrier to apply the first radio-frequency identification tag to the length of tape; and applying the length of tape and the radio-frequency identification tag to an object.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention generally provides a radio-frequency identification tag and tape applicator that applies a tag to a length of tape and the length of tape with the tag to an object, such as an item of manufacture, a package, or carton. The present invention also generally relates to a radio-frequency identification tag applicator that applies radio-frequency identification tags to objects. The present invention also generally relates to methods of applying radio-frequency identification tags to tape. The present invention also generally relates to a variety of embodiments of a package in combination with a radio-frequency identification tag.

Figure 1:
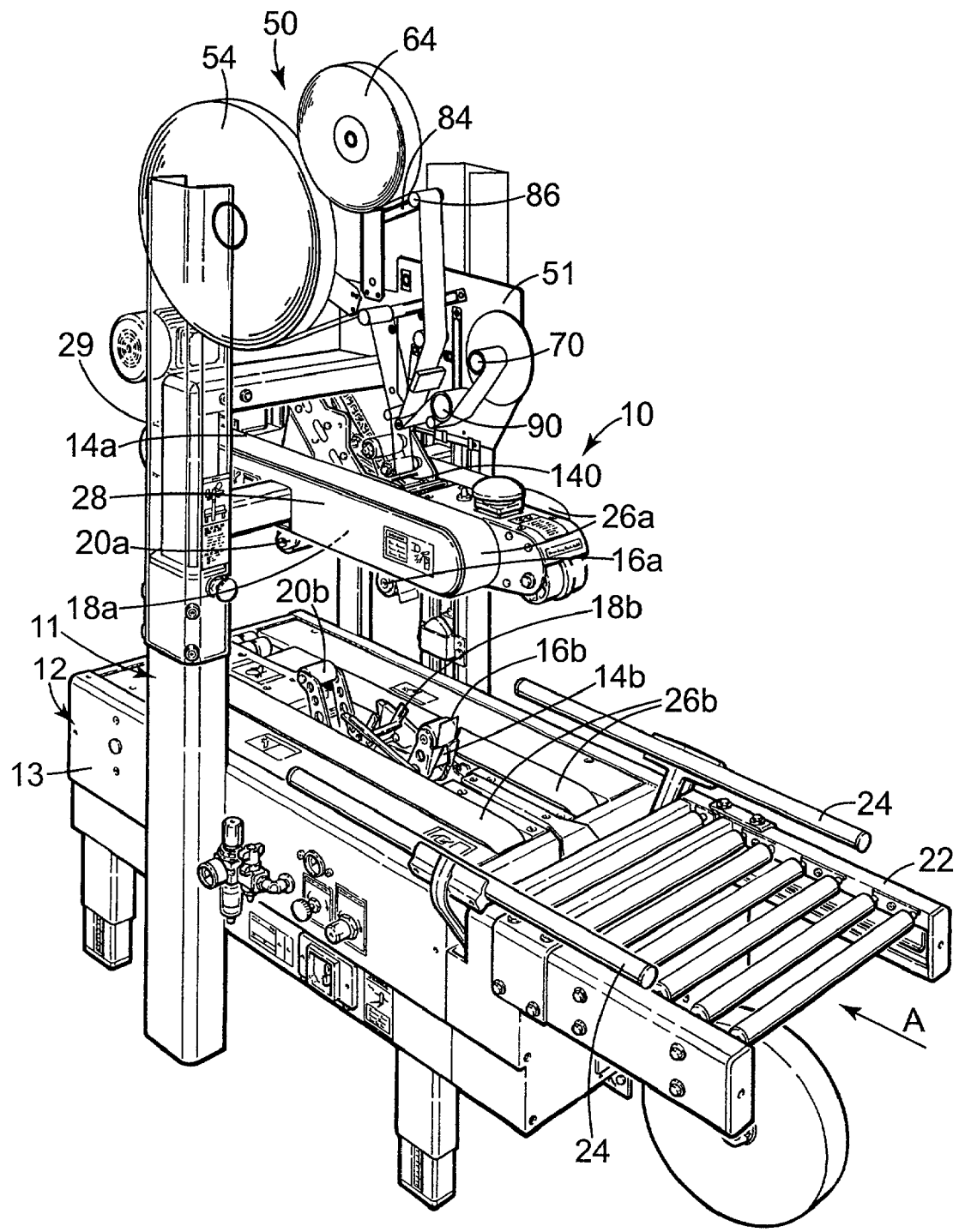
FIG. 1 is an isometric view of a preferred embodiment of the radio-frequency identification tag and tape applicator of the present invention.

A preferred embodiment of a radio-frequency identification tag and tape applicator 10 of the present invention is illustrated in FIG. 1. The tag and tape applicator 10 includes a tape applicator 12, at least one taping head 14, and a tag and tape handling system 50. The tape applicator 12 includes a main frame 11. The main frame 11 includes a taping head frame 28 and machine frame 13, which are attached to each other by columns. The taping head frame 28 preferably includes a second interrogator 29 mounted to it. The machine frame includes a conveyor 22, adjustable guides 24, and drive belts 26. An object may be inserted in the direction of A into the tag and tape applicator to apply a length of tape and a tag to the object. Preferably, the object is a package and more preferably, the package is a box. The conveyor receives the box and conveys the box to the upper drive belts 26a and the lower drive belts 26b. The adjustable guides 24 guide the box along the conveyor 22, onto lower drive belts 26b, and under upper drive belts 26a. The taping head frame 28, which is mounted directly above the machine frame 13 by the columns, includes upper drive belts 26a, similar to lower drive belts 26b. Once the box is inserted into the tag and tape applicator 10 by conveyor 22 and guides 24, the drive belts 26a, 26b drive the box through the tag and tape applicator 10 and then out the side opposite the conveyor 22.

An upper taping head 14a is held over the machine frame 13 by the taping head frame 28. Preferably, the tag and tape applicator 10 also includes a lower taping head 14b mounted inside the machine frame 13 opposite the upper taping head 14a. Both upper and lower taping heads 14a, 14b include a tape applying mechanism 16a, 16b, respectively, and a tape cutting mechanism 18a, 18b, respectively. Preferably, the tape applying mechanism is an applicator roller. However, other tape applying mechanisms known in the art are suitable, such as a rigid or soft pad or a curved member or shoe. Preferably, the tape cutting mechanism is a blade. However, other tape cutting mechanisms known in the art are suitable, such as scissors, a hot wire cutter, a laser, or high-pressure air. Both upper and lower taping heads 14a, 14b may include an optional buff roller 20a, 20b, respectively. Both the upper and lower taping heads 14a, 14b preferably include a box detection sensor 140.

A suitable tape applicator 12 is commercially available from Minnesota Mining and Manufacturing Company, located in St. Paul, Minn., under the trade name 3M-Matic, as 700rks Random Case Sealer. Other suitable tape applicators including a printer for printing on the tape are commercially available from Minnesota Mining and Manufacturing Company, located in St. Paul, Minn., under the trade name 3M-Matic, as CA2000 Corner Label Applicator and as PS2000 Print and Seal Applicator. A suitable taping head 14 is commercially available from Minnesota Mining and Manufacturing Company, located in St. Paul Minn., under the trade name AccuGlide II.

The tag and tape applicator 10 includes a tag and tape handling system 50 mounted to the frame 11 above the taping head frame 28. The tag and tape handling system 50 is explained in more detail in reference to FIGS. 2 and 3.

Figure 2:
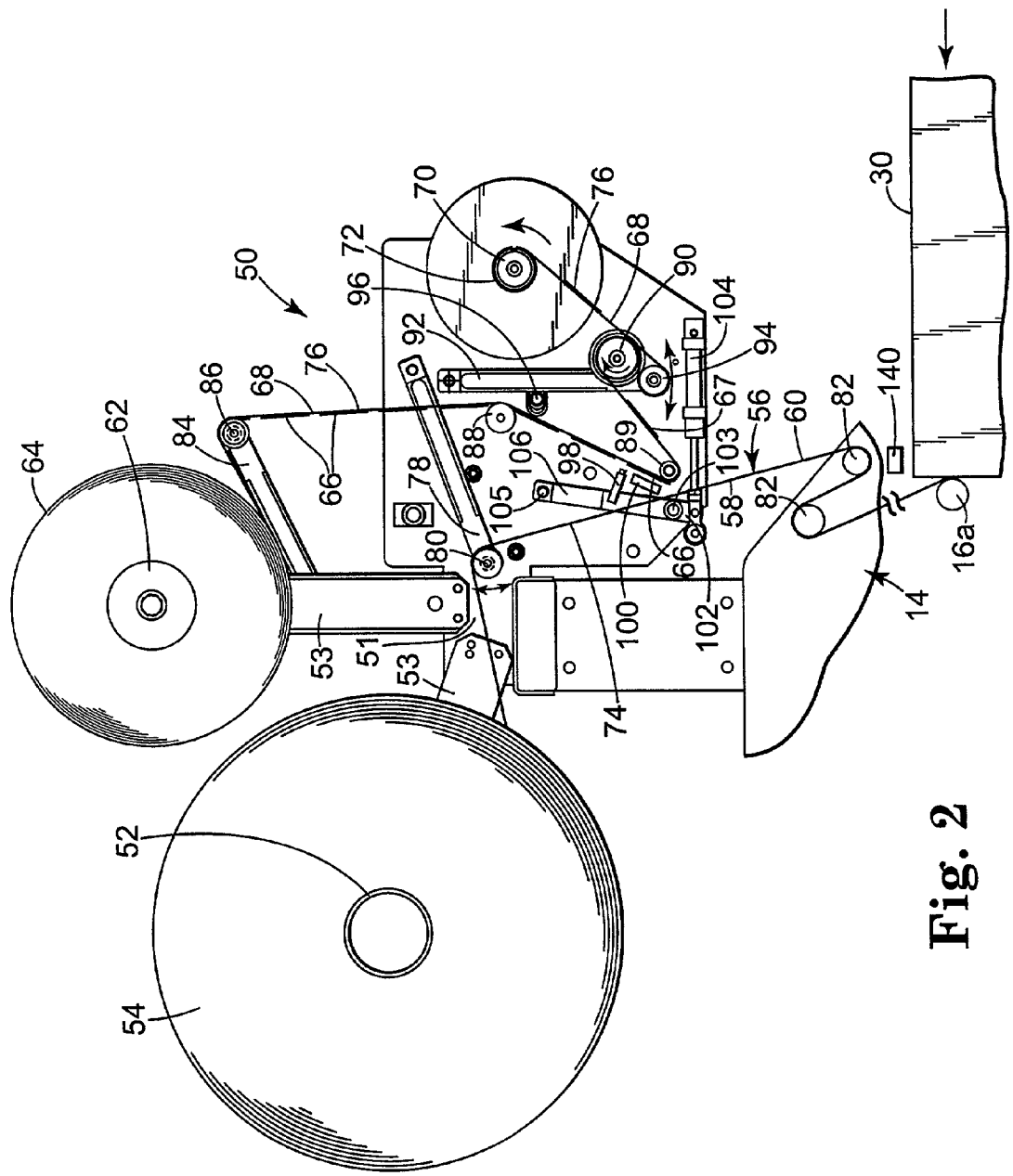
FIG. 2 is a side view of the tag and tape handling system of the present invention with a tag applying mechanism in a first position.
Figure 3:
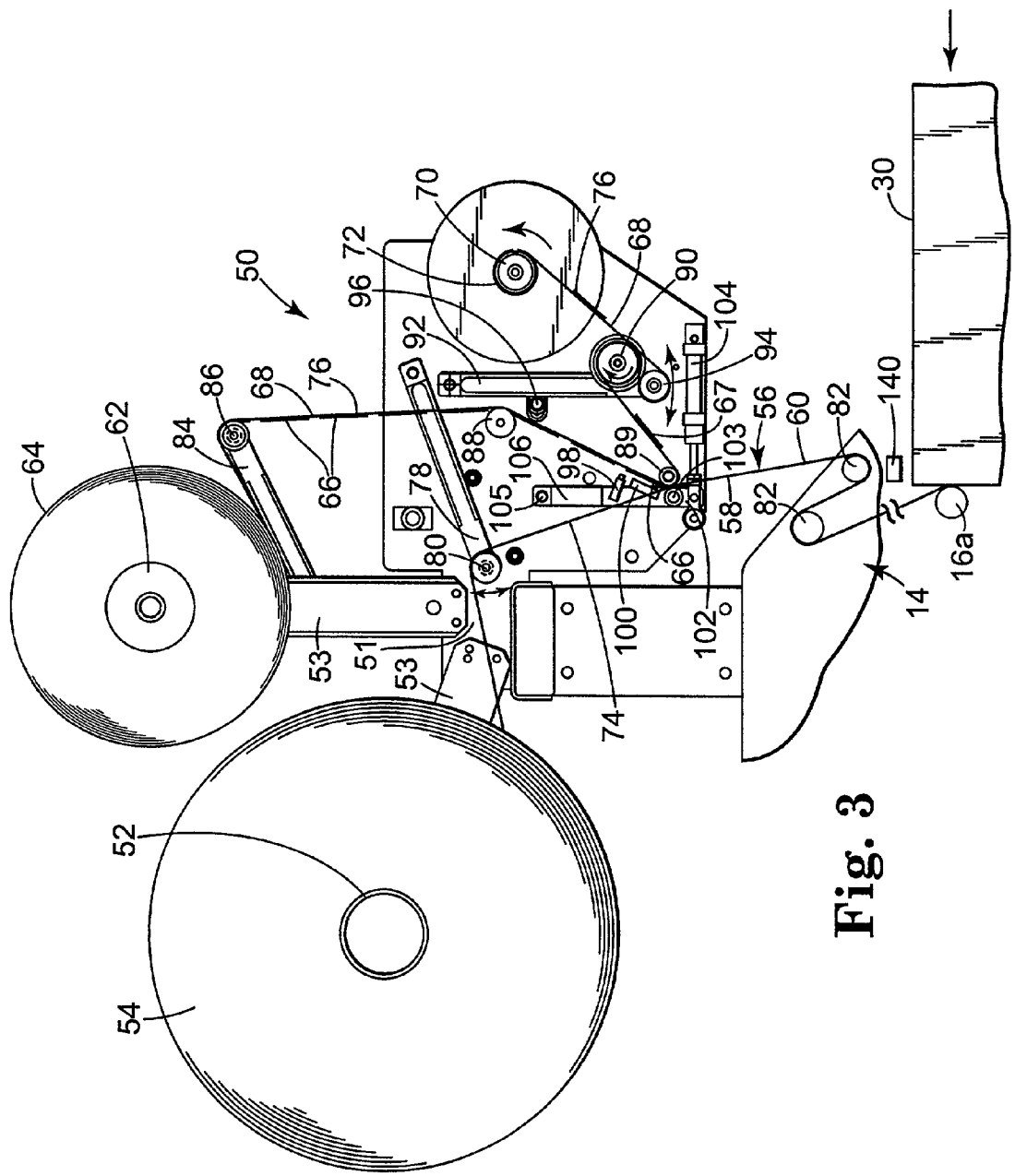
FIG. 3 is a side view of the tag and tape handling system of FIG. 2 with the tag applying mechanism in a second position.

FIGS. 2 and 3 illustrate the tag and tape handling system 50 of tag and tape applicator 10. The tag and tape handling system 50 includes a base 51, a tape supply holder 52 attached to the base 51 by support 53, and a tag supply holder 62 attached to the base by another support 53. Preferably the tape supply holder 52 and tag supply holder 62 are rollers for receiving a roll. However, the holders 52, 62 could include a holder for receiving a stack of individual lengths of tape or a stack of individual tags. The tag and tape handling system 50 also includes a first dancer arm 78 having a roller 80, a second dancer arm 84 having a roller 86, and a third dancer arm 92 having a roller 94. The dancer arms 78, 84, 92 are attached to base 51 and rotate about the pivots located opposite their respective rollers 80, 86, and 94. The tag and tape handling system 50 also includes an idler roller 88, an idler roller 89, a driven roller 90 which includes a motor (not shown), and a carrier roll holder 70. A motor (not shown) drives carrier roll holder 70. The tag and tape handling system 50 also includes sensor 96 located adjacent the third dancer arm 92. When the third dancer arm rotates clockwise in front of sensor 96, the sensor 96 is triggered, which in turn sends a signal to the motor on the carrier roll holder 70 to start turning the carrier roll holder clockwise to take up the carrier 68. The tag and tape handling system 50 also includes a tag applying mechanism 102 for applying a tag to a length of tape. The tag applying mechanism 102 includes an arm 106 that pivots about pivot 105, a roller 103 mounted on the arm 106, and an actuator 104 that moves the arm 106 about pivot 105. Actuator 104 is preferably an air cylinder. The tag applying mechanism 102 is movable between a first position illustrated in FIG. 2, and a second position illustrated in FIG. 3, which is explained in more detail below. The tag and tape handling system 50 also includes a position sensor 98 that locates the position of the tags and a first interrogator 100 that tests and writes information to the tags, both of which are explained in more detail below.

An example of a suitable sensor 96 is commercially available as an NPN type proximity sensor, part number Bi5U-M18-AN6X-H1141, from Turck, Inc. located in Minneapolis, Minn. An example of a suitable position sensor 98 is commercially available as a position sensor, part number CZ-K1, from Keyence Corporation of America located in Woodcliff Lake, N.J. An example of a suitable first interrogator 100 is commercially available as an interrogator assembly from Inside Technologies located in Aix-en-Provence, France, as part number M2 10H.

A tape roll 54 is mounted on the tape supply holder 52. The tape 56 on the tape roll 54 includes a backing 58 and an adhesive 60 on the backing. An example of a suitable tape is commercially available as Scotch brand box sealing tape No. 375 from Minnesota Mining and Manufacturing Company, located in St. Paul, Minn. The tape 56 preferably moves along the following tape path 74 within the tag and tape handling system 50: a) from the tape supply holder 52 to the roller 80 on first dancer arm 78; b) then between the roller 103 on the tag applying mechanism 102 and the idler roller 89; and c) then to the idler rollers 82 in the taping head 14. The tape 56 then preferably moves along the following tape path within the taping head 14: a) from the idler rollers 82; b) then to the tape cutting mechanism 18 (shown in FIG. 1); and then to the tape applying mechanism 16. When loading a new roll of tape 54 onto the tape supply holder 52, the tape is initially threaded through the tag and tape applicator 10 according to the tape path outlined above.

A roll 64 of tags 66 on a carrier 68 is mounted on the tag supply holder 62. The tags 66 are preferably radio-frequency tags 66, however the tags 66 may be any type of tags known in the art. When the term "radio-frequency identification tag" is used throughout the specification, including the claims, it shall mean any tag capable of receiving, storing, and transmitting information through use of radio frequency waves. Radio-frequency identification tags are capable of receiving, storing and transmitting information and may be of any type suitable for this purpose. The tags may include an antenna, circuitry for processing radio-frequency signals, a microprocessor and digital memory. They may be passive devices, which only transmit signals upon receiving an interrogation signal and which rely on power contained in the incoming radio-frequency waves. They may also be active devices, which continuously or periodically transmit signals and include their own power supplies. Examples of commercially available radio-frequency identification tags include Intellitag brand RFID tags currently available from Intermec Technologies Corporation located in Everett, Wash., RFID tags currently available from Rafsec OY, located in Tampere, Finland, and SCS Corporation located in San Diego, Calif. under the brand named Duralabel. Preferably, each tag 66 includes a layer of adhesive, which adheres the tag 66 to the carrier 68. In this embodiment, the carrier is a non-adhesive liner. Alternatively, the carrier could include a layer of adhesive, and the tags would adhere to the layer of adhesive on the carrier 68. In this embodiment, the tags 66 are non-adhesive tags.

The radio-frequency identification tags 66 on carrier 68 preferably move along the following carrier path 76 within the tag and tape handling system 50: a) from the tag supply holder 62; b) then to the roller 86 mounted on the end of second dancer arm 84; c) then to idler roller 88; d) then past the position sensor 98; e) then past the first interrogator 100; f) then around idler roller 89; g) then around drive roller 90; h) then around the roller 94 mounted on the end of the third dancer arm 92; and i) then to carrier roll holder, which is driven by a motor (not shown). When mounting a new roll 64 of tags 66 on carrier 68 onto tag supply holder 62, the tags 66 and carrier 68 are initially threaded through the tape and tag handling system 50 according to the carrier path outlined above. Although the radio-frequency identification tags 66 on carrier 68 preferably move along the carrier path 76 outlined above, it is not essential that the tag and tape handling system 50 have this specific order of parts along the carrier path.

The tag and tape applicator 10 adheres a length of tape and a radio-frequency identification tag to an item or package, preferably a box. The radio-frequency identification tags can store a wide variety of information about the item or package to which it is adhered. For example, a tag may store a code indicative of the identity of the item or package. It may also store information about the movement history of the item or package, or about the weight of the item or package. The tag may store information about the contents of the package such as an inventory of the contents, value and manufacturer of the items in the package, when the package was sealed, hazard information regarding the contents of the package or transportation codes of the contents or package, required storage conditions of the package, or date of manufacture of the contents or warranty information concerning the contents.

To start the process of applying a tag and length of tape to an object, preferably a box, the motor on the drive roller 90 starts to pull the carrier 68 through the tag and tape handling system 50. The motor will continue to rotate drive roller 90 until the position sensor 98 locates the edge of a tag 66, at which point the motor will stop rotating the drive roller 90. In this location, the tag 66 is positioned directly in front of the first interrogator 100. The first interrogator 100 preferably first tests the tag 66 for the functionality of the staged tag 66. (If the tag 66 is not functional, then the tag and tape handling system 50 performs another sequence of steps described below). Next, a box 30 is inserted into the tag and tape applicator 10. As the box moves along the conveyor and belts, the box detection sensor 140 is triggered, sending a signal to the first interrogator 100 and then the first interrogator 100 writes information to the tag 66. Next, the first interrogator 100 preferably interrogates the tag 66 to verify that the information was properly written to the staged tag 66. Then, the box contacts the applying mechanism 16 adhering a first end of a length of tape 56 to the box. (Although the tag is tested, written and verified by first interrogator 100, the system 50 may include multiple antennae to perform these individual functions). During this time, the tag applying mechanism 102 is in the first position, as illustrated in FIG. 2. After the tape is adhered to the box and after the box detection sensor 140 activates a control system which determines a predetermined delay, the tag applying mechanism 102 moves from the first position to the second position, as illustrated in FIG. 3 and drive roller 90 starts to drive the carrier 68. In this second position, the tag applying mechanism 102 brings the adhesive 60 of tape 56 into contact with the tag 66. As the box continues to move through the applicator 10, the tape 56 will be pulled along the tape path, pulling the tag 66 with it and separating the tag from the carrier 68. Preferably, the bond between the adhesive on the tape and the tag is stronger than the bond between the tag and the carrier. The adhesive 60 of the tape 56 assists in the separation of the tag 66 from the carrier 68 and adheres the tag 66 to the tape 56. The tag applying mechanism 102 remains in the second position until the tag 66 is fully adhered to the tape 56 and then it returns to the first position. The motor will continue to rotate drive roller 90 until the position sensor 98 locates the edge of a new tag 66, at which point the motor will stop rotating the drive roller 90. After the box detection sensor 140 is triggered by the presence of another box, the entire process will repeat. As the process is repeated several times, the carrier 68 continues along the carrier path 76 until the carrier 68 is wrapped onto a roll 72 around carrier roll holder 70.

As the carrier 68 moves through the tag and tape handling system 50, a loop or short length of carrier 68 is created between the driver roller 90 and the roller 94 on the end of third dancer arm 92. As the loop or short length of carrier 68 lengthens, the third dancer arm 92, which is biased by a spring (not shown), swings clockwise and triggers the sensor 96. When the sensor 96 is triggered, it sends a signal to the motor on the carrier roll holder 70 to turn the carrier roll holder 70 counterclockwise to wrap the carrier 68 into a roll 72 of carrier 68.

If, in the above sequence of events described above, the first interrogator 100 tests a tag for the functionality of the tag and the tag 66 is not functional, then the motors on drive roller 94 and carrier roll holder 70 will start up and continue to move the carrier 68 and non-functioning tag 67 along the carrier path 76 to roll 72 without applying the nonfunctional tag to the tape 56. The tag applying mechanism 102 will remain in the first position illustrated in FIG. 2. The tag and tape handling system 50 will then repeat the sequence of steps outlined above, until another tag 66 is located in front of first interrogator 100.

As the box continues to move through the applicator 10, the tape 56 continues to move along the tape path 74 outlined above with the tag 66 adhered the adhesive of the tape 56. The tape and tag 66 travel from the tag applying mechanism 102, around idler rollers 82, to the tape cutting mechanism 18. The tape cutting mechanism 18 cuts the tape forming a length of tape with a radio-frequency identification tag 66 adhered to it. Lastly, the tape applying mechanism 16 finishes applying the length of tape and tag to the box 30. The buff roller 20 buffs the second end of the length of tape on the box 30, as the box 30 exits the tag and tape applicator 10. As the box exits the tag and tape applicator 10, the second interrogator 29 verifies the information on the tag on the box. This optional verification step will help indicate whether the tag was damaged during application or during subsequent handling. Alternatively, the second interrogator 29 may write additional information to the tag.

The tag and tape applicator 10 may have multiple tags 66 spaced from each other in the queue waiting to be applied or only one tag on the tape 56 extending between the tag applying mechanism 102 and the tape applying mechanism 16. For example, as a first box moves through the tag and tape applicator 10 and a first length of tape and a first tag is applied to the first box, the first interrogator 100 may test, write, and verify information on a second tag corresponding to contents in a second box following the first box. Then, the tag applying mechanism 102 applies the second tag to the tape 56. Alternatively, the tag and tape applicator 10 may apply a first tag to a first length of tape, which is immediately applied to a first box without having the tag in a queue waiting to be applied.

After a period of time, the carrier roll holder 70 will contain a roll 72 of carrier and non-functioning tags 67. This roll 72 may be taken off the carrier roll holder 70 and returned to a tag manufacturer for a rebate on the non-functioning tags. The tag and tape applicator 10 may include a tag counting device, such as an optional sensor located close to the carrier path leading to the carrier liner roll 70, which will automatically count the number of non-functioning tags 67 as they move along the carrier path 76, so a user will know how many non-functioning tags 67 the roll 72 will contain. Alternatively, the first interrogator 100 may include a counting device to count the number of non-functioning tags as it tests the tags 66 or to count the total number of functional tags and nonfunctioning tags.

Figure 4:
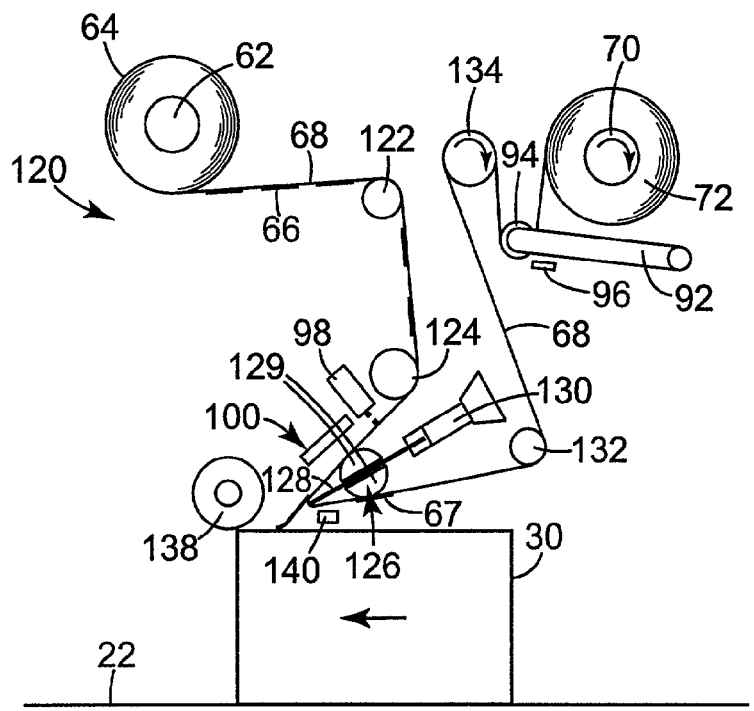
FIG. 4 is a schematic view of a preferred embodiment of a radio-frequency identification tag applicator of the present invention with a tag dispensing mechanism in a first position.
Figure 5:
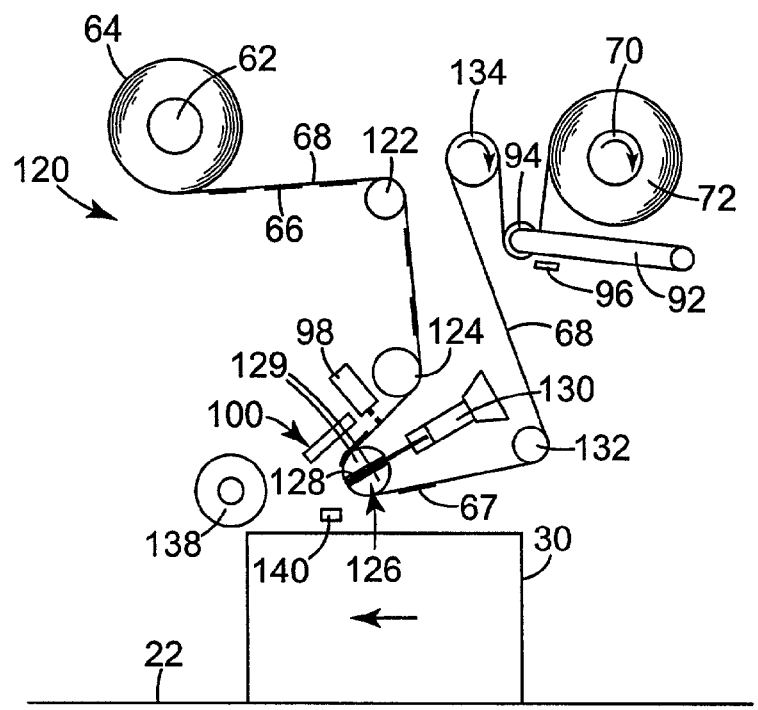
FIG. 5 is a schematic view of the radio-frequency identification tag applicator of FIG. 4 with the tag dispensing mechanism in a second position.

FIGS. 4 and 5 illustrate a preferred embodiment of a radio-frequency identification tag applicator 120 of the present invention. The radio-frequency identification tag applicator 120 operates in a manner similar to the tag and tape applicator 10 with the exception of an alternative tag dispensing mechanism 126 and that the radio-frequency tags are applied directly on the object without the use of tape.

The tag applicator 120 includes a tag supply holder 62 for receiving a roll 64 of radio-frequency tags 66 on a carrier 68, similar to those described above in reference to the tag and tape applicator 10. Preferably, the tags include a layer of adhesive on a non-adhesive liner. The tag applicator 120 also includes an idler roller 122, an idler roller 124, an idler roller 132, a drive roller 134, dancer arm 92 including a roller 94, a buff roller 138, and a carrier roll holder 70. A motor (not shown) drives carrier roll holder 70 and a motor (not shown) drives drive roller 134. The tag applicator 120 also includes a position sensor 98, a sensor 96, and a first interrogator 100, similar to those described above in reference to the tag and tape applicator 10. The tag applicator 120 also includes a tag dispensing mechanism 126. The tag dispensing mechanism 126 includes an actuator 130, a platen 128 mounted on the end of the actuator 130, and two opposing platen guides 129, which guide the movement of the platen 128 by the actuator 130. Preferably, the actuator 130 is an air cylinder. The outside surfaces of the platen guides 129 are hemispherical so that together they form a cylinder for the tags 66 and carrier 68 to travel around without the tags 66 separating from the carrier 68. The platen 128 includes a sharp radius or point at its end opposite the actuator 130 to help separate the tag from the carrier, when the tag dispensing mechanism 126 is in the first position.

The radio-frequency identification tags 66 on carrier 68 preferably move along the following carrier path 76 within the tag applicator 120: a) from the tag supply holder 62; b)

then to the idler roller 122; c) then to the idler roller 124; d) then past the position sensor 98; e) then past the interrogator 100; f) then to the tag dispensing mechanism 126; g) then to the idler roller 132; h) then to the drive roller 134; i) then to idler roller 136; and j) then onto carrier roll holder 70. Although the radio-frequency identification tags 66 on carrier 68 preferably move along the carrier path 76 outlined above, it is not essential that the tag and tape handling system 50 have this specific order of parts along the carrier path.

The tag dispensing mechanism 126 is moveable between a first position, as illustrated in FIG. 4, and a second position, as illustrated in FIG. 5. In the first position, the actuator moves the platen 128 to extend beyond the platen guides 129 to separate the tags 66 from the carrier 68 or to dispense the tags 66. In the second position, the actuator 130 positions the platen 128 so that it does not extend beyond the platen guides 129. In this position, the tags 66 remain on the carrier 68 as they travel on the carrier path along the outside surfaces of the platen guides 129. In this second position, the tag dispensing mechanism 126 does not dispense the tags 66.

Similar to the tag and tape applicator 10 described above, the motor on the drive roller 134 is triggered by the box detection sensor 140 and starts to pull the carrier 68 along the carrier path through the tag applicator 120. The motor will continue to rotate roller 134 until the position sensor 98 locates the edge of a tag 66, at which point the motor will stop rotating the roller 134. In this location, the tag 66 is positioned directly in front of the first interrogator 100. The first interrogator 100 preferably first tests the tag 66 for the functionality of the tag 66, and if the tag 66 is functional, then the first interrogator 100 writes information to the tag 66. (If the tag 66 is not functional, then the tag applicator 120 performs another sequence of steps described below.) Next, the first interrogator 100 preferably reads or interrogates the tag 66 to verify that the information was properly written to the tag 66. During this time, the tag dispensing mechanism 126 is in the first position, as illustrated in FIG. 4. After the first interrogator 100 tests, writes, and verifies the information on the tag 66, the tag dispensing mechanism 126 remains in the first position, as illustrated in FIG. 4, to dispense the tag. In this first position, the tags 66 continue to move in a straight direction along the platen due to the relative stiffness of the tags 66 as compared to the carrier 68, while the carrier 68 or liner is pulled in an opposite direction around the platen edge. In this first position, the tag dispensing mechanism dispenses the tags onto an object, preferably a package or a box 30, as it is moves along conveyor 22 with the adhesive from the tag adhering to the box. The motor on drive roller 134 will then start up again when the box detection sensor 140 is triggered by the presence of another box to repeat the process. Eventually the carrier 68 continues along the carrier path 76 until the carrier 68 is wrapped into a roll 72 around carrier roll holder 70.

When the first interrogator 100 tests a tag for the functionality of the tag and the tag 66 is not functional, then the tag dispensing device 126 moves to the second position, illustrated in FIG. 5, and the motors on drive roller 134 and carrier roll holder 70 will start up and continue to move the carrier 68 and non-functioning tag 67 along the carrier path. The tag and tape handling system 50 will then repeat the sequence of steps outlined above, until another tag 66 is located in front of first interrogator 100.

As the carrier 68 is moving through the tag applicator 120, a loop or short length of carrier 68 is created between the driver roller 134 and the roller 94 on the end of dancer arm 92. As the loop or short length of carrier 68 lengths, the dancer arm 92, which is biased by a spring (not shown), swings counter clockwise and eventually triggers the sensor 96. When the sensor 96 is triggered, it sends a signal to the motor on the carrier roll holder 70 to turn the carrier roll holder 70 clockwise to form a roll 72 of carrier 68.

Preferably, both the tag and tape applicator 10 and the tag applicator 120 include a control system for operating the sensors and motors on the applicators. One example of a suitable control system is a single board computer SBS-150 from Octagon Systems located in Colorado and an industrial input/output control board from Opto 22 located in Temecula, Calif.

The tag and tape applicator 10 may include an optional printer for printing on the tape and/or the tags prior to adhering them to objects. For example, the applicator 10 may include a tape applicator 12 such as the print and apply applicators commercially available from Minnesota Mining and Manufacturing Company, located in St. Paul, Minn. under the brand name 3M-Matic as CA2000 Corner Label Applicator and PS2000 Print & Seal Applicator. In addition, the tag applicator 120 may include an optional printer for printing on the tags before applying them to objects.

The information written to the radio-frequency identification tags in either the tag and tape applicator 10 or the tag applicator 120 could be supplied by the system described in U.S. patent application Ser. No. 09/893,823, "Package Labeling," (3M file number 56729US002), that was filed on Jun. 28, 2001, which is hereby incorporated by reference.

Figure 6:
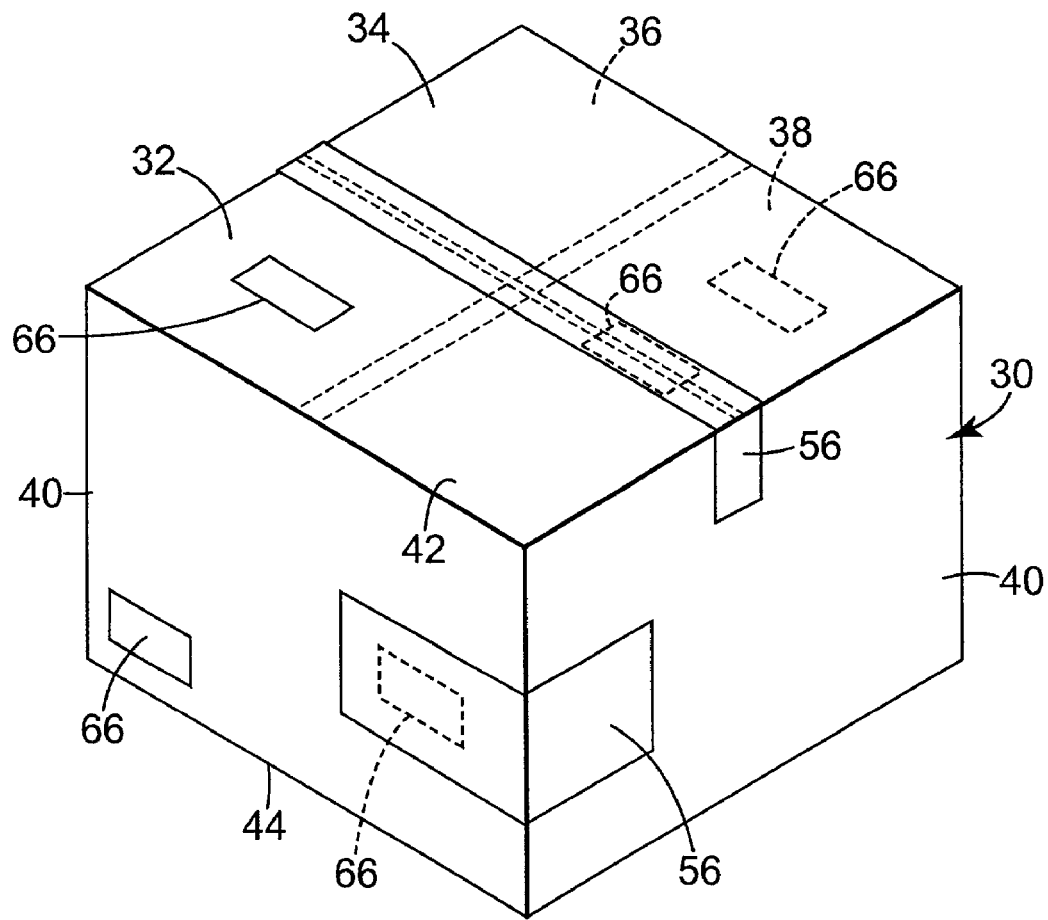
FIG. 6 is an isometric view of a box illustrating alternative locations for radio-frequency identification tags on the box.

FIG. 6 illustrates alternative positions for a radio-frequency tag 66 on a box 30. The box 30 includes four opposing sides 40, a top 42 and a bottom 44. The top 42 and bottom 44 are each made of two external or major flaps 32, 34 and two internal or minor flaps 36, 38. To form the top 42 or bottom 44, a user first brings the two minor flaps together to be perpendicular to the sides 40 and then brings the two major flaps together to also be perpendicular to the sides 40 and to enclose the minor flaps. A seam is created between the first and second major flaps 32, 34. Tape 56 is used to seal the seam of the box 30. A radio-frequency tag 66 is located between the tape 56 and box 30 along the seam of the flaps 32, 34. If the tape 56 is clear, a user may see the tag 66 and prevent cutting the tag when the box 30 is opened. However, if the tape 56 is not clear, but opaque, the tag 66 may be hidden from view, providing extra security for unauthorized intentional removal from the box. Additionally, this embodiment provides extra security by reducing the probability of tampering with the tag itself or the information contained in the tag. Alternatively, a length of tape 56 may extend around a corner of the box 30. In this embodiment, the tag 66 is between the tape 56 and one side 40 of the box 66. The tape and tag applicator 10 illustrated in FIGS. 1-3 may be used to apply the lengths of tape 56 and tags 66 on box 30, as described above.

Without the use of tape, the radio-frequency tags 66 may also be applied anywhere on the box. For example, the tag 66 may be applied to the side 40 of the box 30 or to the top 42 of the box 30. Alternatively, a tag 66 may be applied to one of the internal or minor flaps 38 prior to sealing the outside or major flaps 32, 34 of the box. Alternatively, a tag may be applied to side of the major flap 34 facing inwards towards the minor flap 38 of the box. In either of these embodiments, the tag 66 is hidden from view or the presence of the tag is minimized, providing extra security by reducing the probability of tampering with either the tag itself or the information contained in the tag. Additionally, this embodiment provides even greater security for the tag from damage as it moved through the supply chain or from unauthorized intentional removal from the box. Alternatively, the tag could be placed anywhere inside the box or anywhere on the exterior surface of the box. The tag applicator 120 illustrated in FIGS. 4-5 may be used to apply tags 66 on box 30, as described above.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A radio-frequency identification tag and tape applicator, comprising:
    a) a tag and tape handling system, comprising:
        i) a base;
        ii) a tape supply holder attached to said base;
        iii) a tag supply holder attached to said base; and
        iv) a tag applying mechanism attached to said base for applying a tag to a length of tape;
        v) a carrier roll holder attached to said base; and
        vi) a carrier path from said tag supply holder to said carrier roll holder; and
        vii) a first interrogator attached to said base;
    b) a roll of a plurality of radio-frequency identification tags on a carrier mounted on said tag supply holder;
    c) a roll of a tape mounted on said tape supply holder;
    d) a taping head for applying the tag and the length of tape to an object, wherein said taping head comprises:
        i) a tape cutting mechanism; and
        ii) a tape applying mechanism, wherein said tag applying mechanism is movable between a first position and a second position, wherein when said tag applying mechanism is in said first position, said tag applying mechanism does not apply one of said radio-frequency identification tags to a length of tape, and wherein when said tag applying mechanism is in said second position, said tag applying mechanism applies one of said radio-frequency identification tags to said length of tape; and
    e) a tape path between said tape supply holder to said tape applying mechanism, wherein said tape cutting mechanism is located on said tape path between said tape supply holder and said tape applying mechanism, wherein said tag applying mechanism is located on said tape path between said tape supply holder and said tape cutting mechanism, and wherein said tag applying mechanism is positioned and configured to alter said tape path when said tag applying mechanism is in said second position;
    f) a control system programmed for controlling operations of said system such that said first interrogator tests one of said radio-frequency identification tags for the functionality of said tag, and if said tag is functional, then said first interrogator writes information to said tag, wherein after said first interrogator writes the information, said first interrogator reads said tag for the information to verify the information was properly written to said tag, and wherein after said first interrogator verifies the information, said tag applying mechanism moves to said second position to contact said tape to adhere one of said radio-frequency identification tags to said tape and to separate said tag from said carrier.

2. A radio-frequency identification tag applicator, comprising:
    a) a radio-frequency identification tag supply holder;
    b) a carrier roll holder;
    c) a carrier path from said radio-frequency identification tag supply holder to said carrier roll holder;
    d) a tag dispensing mechanism along said carrier path between said radio-frequency identification tag supply holder and said carrier roll holder, said tag dispensing mechanism configured to move linearly against the carrier to apply a tag to an object; and
    e) an interrogator for writing information to radio-frequency identification tags along said carrier path between said radio-frequency identification tag supply holder and said tag dispensing mechanism.

3. The radio-frequency identification tag applicator of claim 2 further comprising a roll of a plurality of radio-frequency identification tags on a carrier mounted on said tag supply holder.

4. The radio-frequency identification tag applicator of claim 3, wherein said applicator is configured such that said interrogator tests one of said radio-frequency identification tags for the functionality of said tag, and if said tag is functional, then said interrogator writes information to said tag.

5. The radio-frequency identification tag applicator of claim 4, wherein said applicator is configured such that after said interrogator writes the information to said tag, said interrogator reads said tag for the information to verify the information was properly written to said tag.

6. The radio-frequency identification tag applicator of claim 5, wherein said tag dispensing mechanism is movable between a first position and a second position, wherein said applicator is configured such that when said tag dispensing mechanism is in said first position, said tag dispensing mechanism dispenses one of said radio-frequency identification tags, and wherein when said tag dispensing mechanism is said second position, said tag dispensing mechanism does not dispense one of said radio-frequency identification tags for application to the object.

7. The radio-frequency identification tag applicator of claim 6, wherein said applicator is configured such that after said interrogator writes information to said tag, said tag applying mechanism is in said first position to apply said tag to the object.

8. A radio-frequency identification tag applicator, comprising:
    a) a radio-frequency identification tag supply holder;
    b) a carrier roll holder;
    c) a carrier path from said radio-frequency identification tag supply holder to said carrier roll holder;
    d) a tag dispensing mechanism along said carrier path between said radio-frequency identification tag supply holder and said carrier roll holder, wherein said tag dispensing mechanism includes a platen and a linear actuator adapted to move said platen, said dispensing mechanism being movable between a first position and a second position, wherein when said tag dispensing mechanism is in said first position, said tag dispensing mechanism dispenses said tag, and wherein when said tag dispensing mechanism is said second position, said tag dispensing mechanism does not dispense said tag for application to a package;

e) an interrogator for writing information to radio-frequency identification tags along said carrier path between said radio-frequency identification tag supply holder and said tag dispensing mechanism;
f) a roll of a plurality of radio-frequency identification tags on a carrier mounted on said tag supply holder; and
g) a conveyor opposite said tag dispensing mechanism such that said conveyor establishes a package path between said conveyor and said tag dispensing mechanism;

wherein said applicator is configured such that said interrogator tests one of said radio-frequency identification tags for the functionality of said tag, and if said tag is determined to be functional, then said interrogator writes information to said tag, wherein after said interrogator writes the information to said tag, said interrogator reads said tag for the information to verify the information was properly written to said tag, and wherein after said interrogator verifies the information, said tag dispensing mechanism moves to said first position to apply said tag to the package traveling along said package path.

\* \* \* \* \*

UNITED STATES PATENT AND TRADEMARK OFFICE
CERTIFICATE OF CORRECTION

PATENT NO.         : 7,383,864 B2
APPLICATION NO. : 10/115353
DATED              : June 10, 2008
INVENTOR(S)      : Peter B. Hogerton It is certified that error appears in the above-identified patent and that said Letters Patent is hereby corrected as shown below:

Title Page
Item [56], References Cited, OTHER PUBLICATIONS, Delete "Frontine" and insert -- Frontline --, therefor.
Item [56], References Cited, U.S. PATENT DOCUMENTS, pg. 2, After "5,552,994A 9/1996 Cannon et al." insert -- 5,982,284 11/1999 Baldwin et al. --.

Signed and Sealed this

Twenty-second Day of December, 2009

David J. Kappos
*Director of the United States Patent and Trademark Office*